(12) United States Patent
Soltner et al.

(10) Patent No.: US 10,040,382 B2
(45) Date of Patent: Aug. 7, 2018

(54) ADJUSTABLE HEADREST FOR MOTOR VEHICLE SEAT

(71) Applicant: Faurecia Sièges d'Automobile, Nanterre (FR)

(72) Inventors: Stéphane Soltner, Mailleroncourt Charette (FR); François Lelievre, Orleans (FR)

(73) Assignee: Faurecia Siéges D'Automobile, Nanterre (FR)

( * ) Notice: Subject to any disclaimer, the term of this patent is extended or adjusted under 35 U.S.C. 154(b) by 0 days.

(21) Appl. No.: 15/482,468

(22) Filed: Apr. 7, 2017

(65) Prior Publication Data
US 2017/0291515 A1    Oct. 12, 2017

(30) Foreign Application Priority Data

Apr. 8, 2016  (FR) ...................................... 16 53097

(51) Int. Cl.
| | |
|---|---|
| *B60N 2/806* | (2018.01) |
| *B60N 2/844* | (2018.01) |
| *B60N 2/809* | (2018.01) |
| *B60N 2/865* | (2018.01) |
| *B60N 2/829* | (2018.01) |
| *B60N 2/80* | (2018.01) |
| *B60N 2/821* | (2018.01) |
| *A47C 7/38* | (2006.01) |
| *B60N 2/897* | (2018.01) |

(52) U.S. Cl.
CPC ............... *B60N 2/829* (2018.02); *A47C 7/38* (2013.01); *B60N 2/80* (2018.02); *B60N 2/806* (2018.02); *B60N 2/821* (2018.02); *B60N 2/865* (2018.02); *B60N 2/844* (2018.02); *B60N 2/897* (2018.02)

(58) Field of Classification Search
CPC ........ B60N 2/865; B60N 2/806; B60N 2/844; B60N 2/809
See application file for complete search history.

(56) References Cited

U.S. PATENT DOCUMENTS

| | | | | |
|---|---|---|---|---|
| 8,899,685 B2* | 12/2014 | Haeske | .................. | B60N 2/809 297/410 |
| 9,085,253 B2* | 7/2015 | Delling | .................. | B60N 2/865 |
| 9,308,844 B2* | 4/2016 | Guenther | ............. | B60N 2/4864 |

(Continued)

FOREIGN PATENT DOCUMENTS

| | | |
|---|---|---|
| DE | 102007048151 B3 | 1/2009 |
| FR | 2979867 A1 | 3/2013 |

*Primary Examiner* — Timothy J Brindley
(74) *Attorney, Agent, or Firm* — Reising Ethington P.C.

(57) ABSTRACT

An adjustable headrest for motor vehicle seat. The headrest includes a support structure fixed to a backrest and a body having a front shell and a rear shell. The front shell has a front face intended for contact with the head of a user of the seat, the front face being movable relative to the support structure along a front-rear direction denoted X, over a total travel distance. The total travel distance is formed by a first travel portion provided by a mounting enabling translational movement of the body relative to the support structure while maintaining the position of the front shell relative to the rear shell substantially constant. The total travel distance is also formed by a second travel portion provided by a mounting enabling translational movement of the front shell alone relative to the rear shell.

11 Claims, 5 Drawing Sheets

(56) References Cited

U.S. PATENT DOCUMENTS

| | | |
|---|---|---|
| 2009/0058162 A1 | 3/2009 | Boes et al. |
| 2010/0127541 A1 | 5/2010 | Kotz |
| 2010/0127548 A1 | 5/2010 | Truckenbrodt et al. |
| 2010/0283306 A1* | 11/2010 | Boes .................... B60N 2/4882 297/408 |
| 2012/0080923 A1 | 4/2012 | Kunert et al. |
| 2012/0080926 A1* | 4/2012 | Fey ...................... B60N 2/4864 297/410 |
| 2018/0043804 A1* | 2/2018 | Shimizu ............... B60N 2/4847 |

* cited by examiner

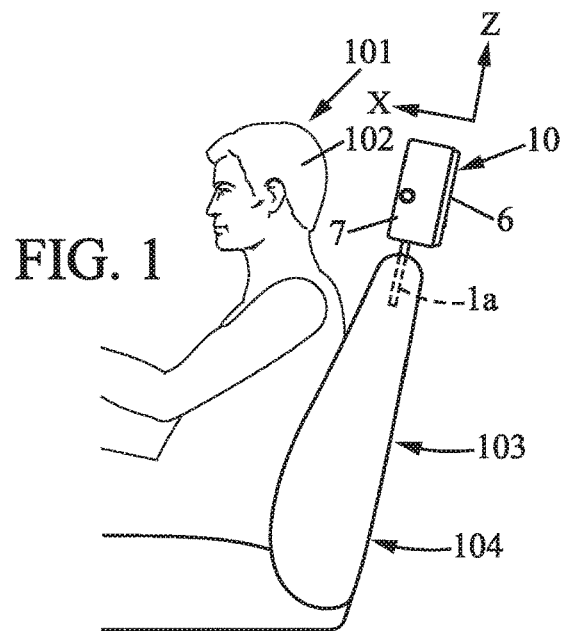
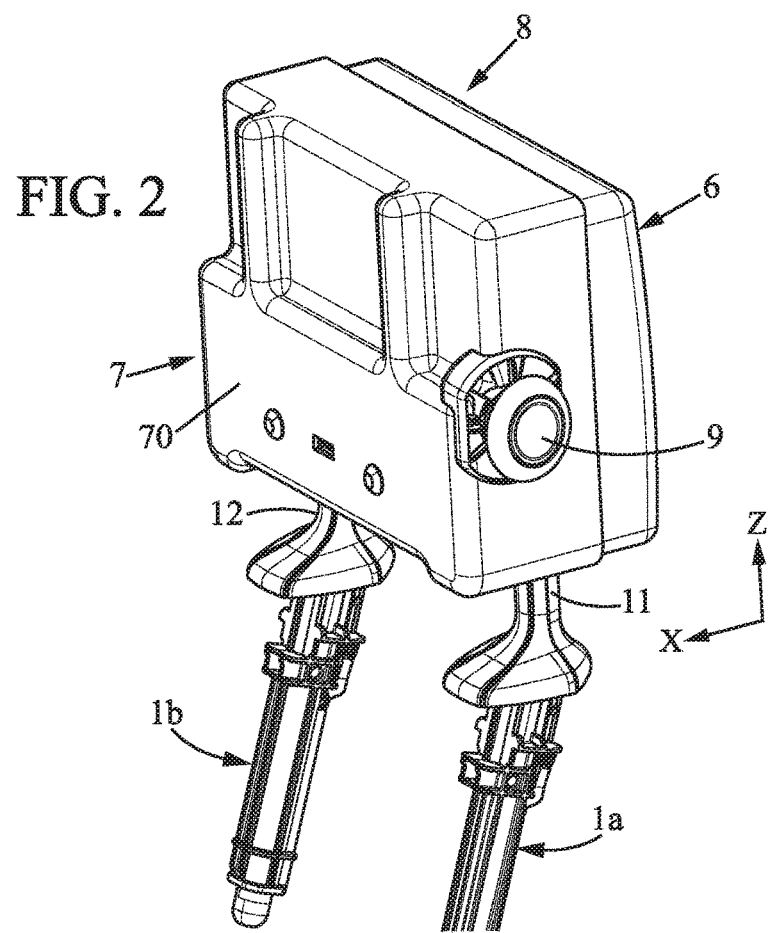

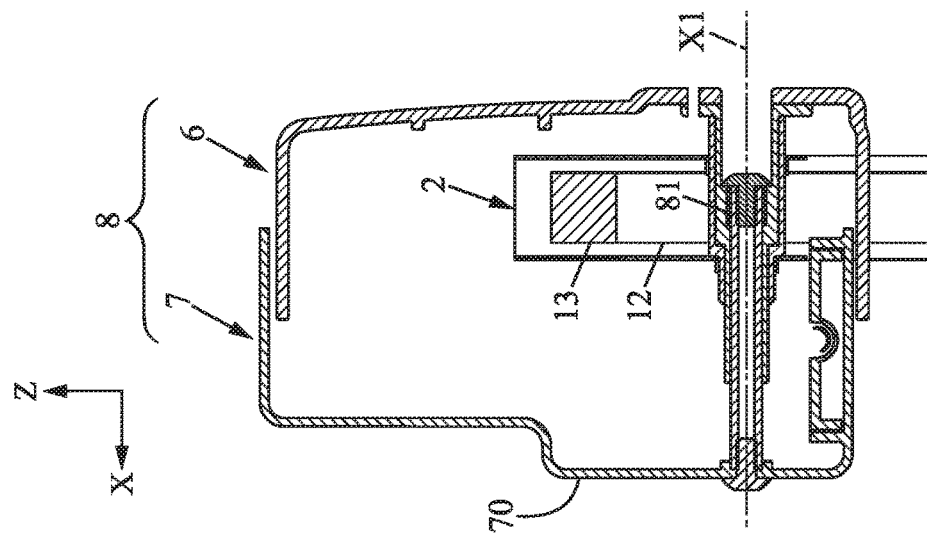
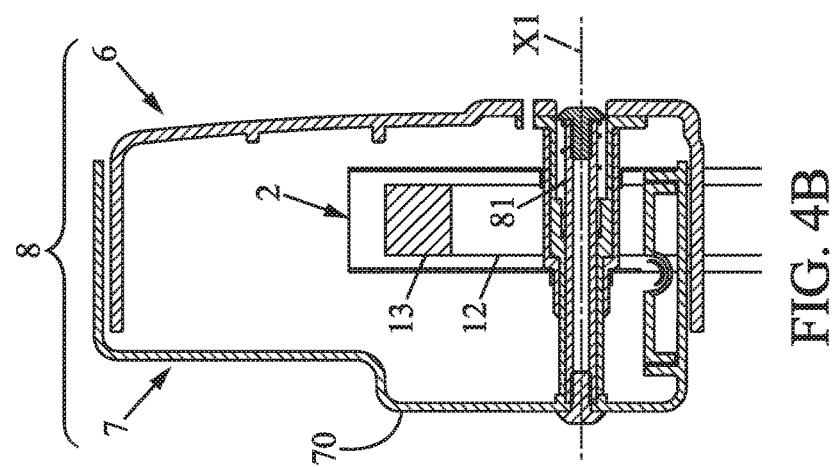
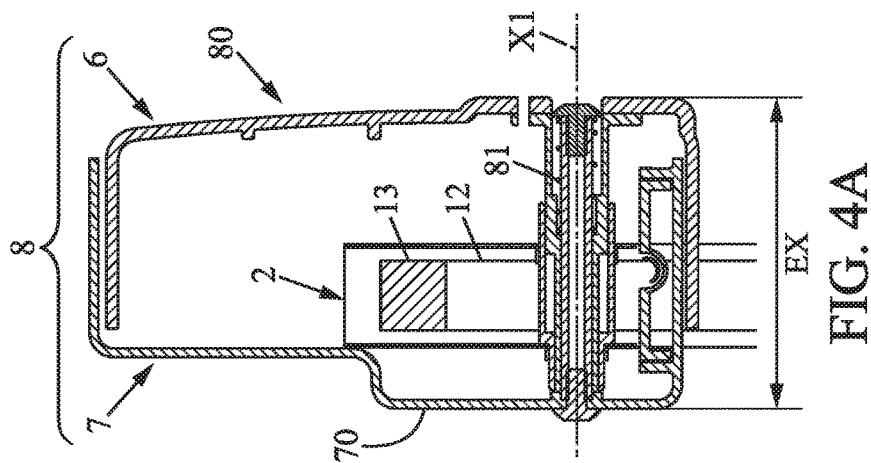

ADJUSTABLE HEADREST FOR MOTOR VEHICLE SEAT

TECHNICAL FIELD

The present invention relates to headrests for motor vehicle seats.

In particular, the invention relates primarily to a headrest where the position of its front face is adjustable in the longitudinal direction (denoted X) (close to the vehicle longitudinal direction) and optionally adjustable in the substantially vertical direction (denoted Z).

BACKGROUND

When using a single-volume ("one-piece") headrest, the adjustment travel along X is rather limited by the compatibility of the internal mechanism and the support structure, and by the style constraints imposed on headrests.

In order to increase the adjustment travel along X, the trend is toward a "dual-volume" solution where the front cushion of the headrest can be moved relative to a base structure in the central and rear area of the headrest.

Such a headrest is known from patent document FR2979867 originating from the Applicant. Another solution is disclosed in US Patent Application Publication No. 2010/0127541. In both cases, the position of the rear part of the headrest is unchanged and the thickness along the longitudinal direction (X) increases when bringing the front face closer to the user's head. However, the thicker the headrest in the longitudinal direction, the more the aesthetic appearance of the headrest is degraded and the more the visibility of the other occupants of the vehicle is affected, in some cases including the driver (field of vision partially obscured by the passenger headrest).

Another concern is related to safety in the event of an impact: this requires positive locking of the front face to prevent rearward travel, in order to protect the neck of the seat occupant in case of impact. In this context, known solutions such as those involving continuous deformation with an upper hinge region are not ideal.

There therefore remains a need to provide a headrest allowing wide adjustment in the longitudinal direction X, while limiting its volume (and therefore the obstruction of the view) and while maintaining compliance with load resistance specifications.

SUMMARY

To this end, the invention proposes, in at least one embodiment, an adjustable headrest for a motor vehicle seat, comprising:
  a support structure intended to be fixed to a backrest of said seat,
  a body connected to the support structure, comprising at least:
    a front shell having a front face intended for contact with the head of a user of the seat,
    a rear shell which forms, in complementarity with the front shell, a casing of the headrest body,
  the front face being movable relative to the support structure along a front-rear direction denoted X, over a total travel distance, this total travel distance being formed by at least:
    a first travel portion provided by a mounting enabling translational movement of the body relative to the support structure, the position of the front shell relative to the rear shell remaining substantially constant,
    a second travel portion provided by a mounting enabling translational movement of the front shell alone relative to the rear shell.

In other words, during the first travel portion, the total thickness of the headrest along X does not change, whereas during the second travel portion only, the total thickness of the headrest along X increases.

With these arrangements, the thickness of the body of the headrest remains constant and moderate for the first travel portion and the headrest has an attractive aesthetic appearance and a narrow profile which facilitates visibility while allowing additional travel when necessary.

In preferred embodiments of the invention, one or more of the following arrangements may possibly be used.

Advantageously, the total travel distance (CT) is at least equal to 50 mm; quite ample travel is thus obtained that is suitable for all morphologies and preferences of the occupants.

According to one embodiment, the first and second travel portions (C1, C2) each have a length that is close to half that of the total travel distance, whereby the total travel distance comprises two balanced portions, the first travel portion and the second travel portion, for example each having a travel distance of at least 25 mm.

Optionally, guiding is provided by guide elements which may be arranged concentrically with spatial overlap, each guide being effective for a length of at least 30 mm, preferably about 40 mm.

According to one embodiment, the headrest comprises a guide plate mounted on the support structure, preferably with a vertical sliding movement, the rear shell and the front shell being directly or indirectly connected to this guide plate; in addition, in an optional feature, the height position of the headrest is adjustable by sliding the guide plate vertically.

According to one embodiment, the rear shell is mounted so as to slide (along X) on the guide plate, forming the first travel portion, and the front shell is mounted so as to slide (along X) on the rear shell, forming the second travel portion. This proves to be a particularly simple and compact assembly.

According to one embodiment, the following guide elements are provided:
  two first guide sleeves 31, 32, securely fixed to the guide plate,
  two second sleeves 41, 42, securely fixed to the rear shell and slidably mounted in the first sleeves,
  two rods 51, 52 rigidly fixed to the front shell and slidably mounted in the second sleeves; this proves to be a particularly compact assembly, thus advantageously obtaining a coaxial, concentric, robust, and compact assembly.

According to one embodiment, there may further be provided elements for locking the position of the headrest, in particular the front shell, and a control device for unlocking the locking elements to enable changing the adjustment position. This allows a simple method for adjusting the position of the headrest along X.

According to one embodiment, it is also possible to provide at least one return spring for biasing the front shell rearward in the absence of external forces and when not locked, whereby the headrest returns naturally to the rearmost position when the control button is actuated and without any particular action by the user.

According to one embodiment, the support structure comprises two headrest uprights extended by headrest pins, extending in a direction substantially corresponding to the vertical when the seat is in the normal position of use, and a cross-member on which the guide plate is mounted, possibly slidably; this is a very mechanically robust assembly, which allows compliance with safety specifications and requirements.

According to one embodiment, advantageously the longitudinal thickness of the headrest body remains less than 95 mm along the first travel portion; there is thus a relatively narrow profile which facilitates a good field of view for the occupants of the vehicle and in particular the driver.

The present invention also relates to a seat comprising a headrest as described above.

Other features and advantages of the invention will become apparent from the following description of one of its embodiments, given by way of non-limiting example, with reference to the accompanying drawings.

BRIEF DESCRIPTION OF THE DRAWINGS

In the drawings:

FIG. 1 is a side view of a vehicle seat equipped with a headrest according to the invention, FIG. 2 is a perspective view of the headrest of the seat of FIG. 1.

DETAILED DESCRIPTION

Figure 3:
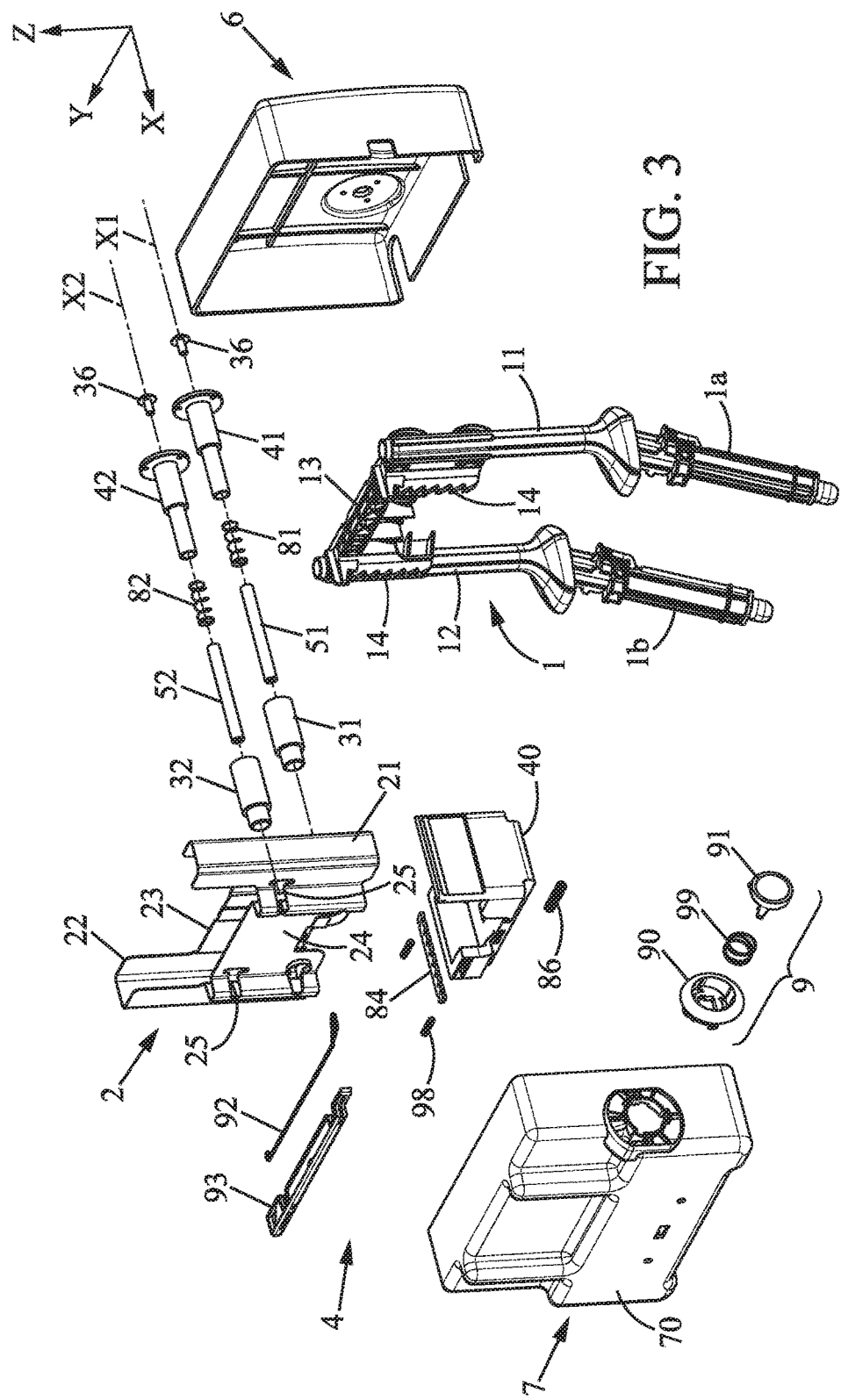
FIG. 3 is an exploded view of the headrest of FIG. 1, FIGS. 4A, 4B, and 4C show sectional views of the headrest body, respectively in the rear position (4A), the intermediate position (4B), meaning at the end of the first travel portion and at the beginning of the second travel portion, and in the foremost position (4C), meaning at the end of the second travel portion.

In the various figures, the same references designate identical or similar elements.

FIG. 1 shows a seat 104 of a motor vehicle, having a seating portion intended for receiving an occupant 101 of the seat and a backrest 103 supporting a headrest 10 by means of two parallel pins 1a, 1b extending along a longitudinal axis of the pins. The pins extend in a direction at or near a first direction Z in the present application, relatively close to the vertical in the normal position of use of the seat.

The seat in question may be the driver seat or the front passenger seat; it is not excluded to apply this invention to the rear seats or to the seats of trucks, vans, utility vehicles, or off-road vehicles.

In the example illustrated, the pins 1a, 1b are inserted without play into two sheaths (not shown) of the backrest 103 in a relatively conventional manner, said pins being extended by uprights 11, 12, extending upwards along direction Z, which are connected by an upper connecting part 13 also called a cross-member. This forms the support structure 1 of the headrest in the sense of the invention.

Advantageously, the headrest with its pins can be removed from the backrest in a manner known per se, and subsequently reinstalled in a manner also known per se.

As will be explained in greater detail below, in the example presented here the headrest 10 is adjustable in what is referred to as the longitudinal direction, denoted X, substantially corresponding to the front-rear direction when the seat is in the normal position of use. More precisely, it is the front face 70 of the headrest that is adjustable to be more or less advanced with respect to the head 102 of the seat occupant 101.

Adjustment may also be provided in the vertical direction, meaning in the direction denoted Z. In the example illustrated, it is the entire body of the headrest that can be moved vertically.

As illustrated in FIGS. 2 to 6, the headrest comprises, in addition to the support structure 1 already mentioned:
- a guide plate 2 mounted so as to slide on the support structure 1 in the vertical direction Z,
- a body 8 connected to the support structure via the guide plate, said body comprising a front shell 7 with a front face 70 intended for contact with the head 102 of a user 101 of the seat, and a rear shell 6 which forms, in complementarity with the front shell 7, a casing 80 of the headrest body,
- locking elements 4 and a control device 9, these locking elements making it possible to immobilize the front shell 7 with respect to the guide plate in the longitudinal direction X and to immobilize the guide plate 2 with respect to the support structure 1 in the vertical direction Z.

It should be noted that the front shell 7 is generally covered with padding and/or a covering (not shown here for reasons of clarity). The same applies to the rear shell 6 which may be covered with a covering (not shown).

The front shell 7 and the rear shell 6 are made of lightweight but relatively rigid synthetic material.

The uprights 11, 12 extended by the pins 1a, 1b are formed by metal tubes, preferably with a slight bend just below the headrest body. The cross-member 13 is made either of overmolded metal or of a synthetic material reinforced with fibers and connected to the uprights by overmolding, or of solid molded plastic with reinforcing ribs.

The guide plate 2 may be made of metal, for example by a process of folding and cutting a metal blank; it is not excluded to create the plate of robust plastic.

More precisely, concerning the kinematics and the assembly of the various elements, we have:
- the guide plate 2 which is mounted to allow translational movement along Z relative to the support structure,
- two first guide sleeves 31, 32 securely fixed to the guide plate 2,
- two second sleeves 41, 42 (which may also be called intermediate sliders) securely fixed to the rear shell and slidably mounted in the first sleeves 31, 32,
- two rods 51, 52 rigidly fixed to the front shell and slidably mounted in the second sleeves 41, 42.

Advantageously, the assembly on the left, meaning the assembly that includes first sleeve 31, second sleeve 41, and rod 51, is concentric to axis X1.

Similarly, the assembly on the right, namely the assembly that includes sleeve 32, second sleeve 42, and rod 52, is similarly mounted in a coaxial arrangement along the axis denoted X2.

Figure 5A:
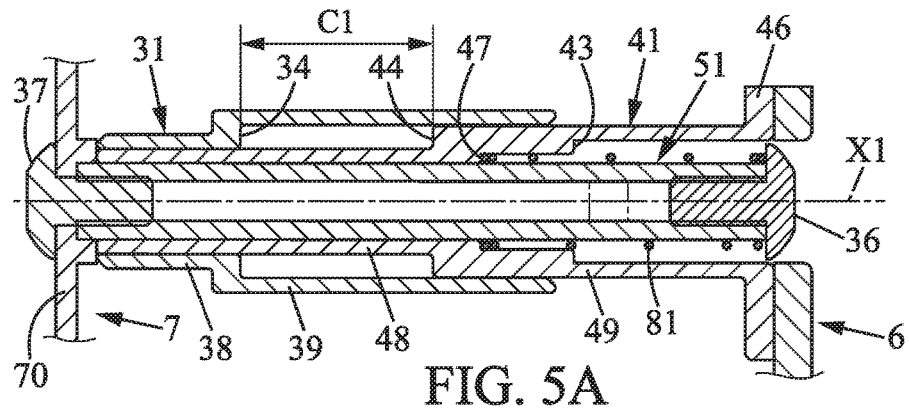
FIGS. 5A, 5B, and 5C show detailed sectional views of the guide elements in different positions respectively corresponding to FIGS. 4A, 4B, and 4C.
Figure 5B:
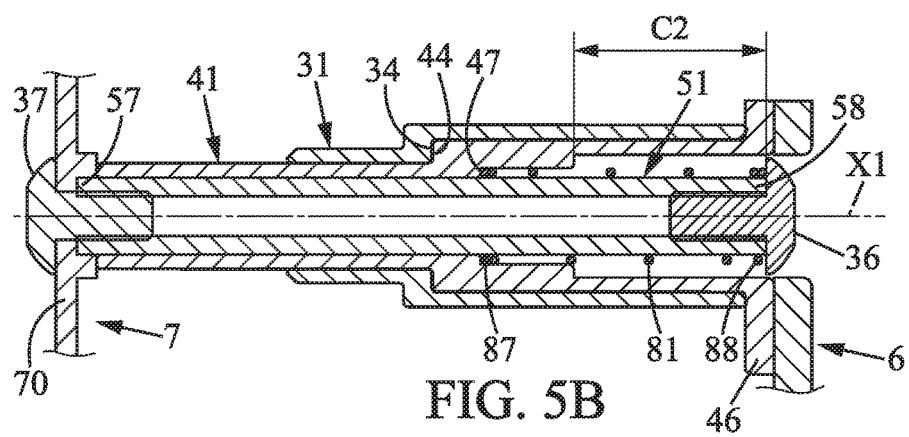
Figure 5C:
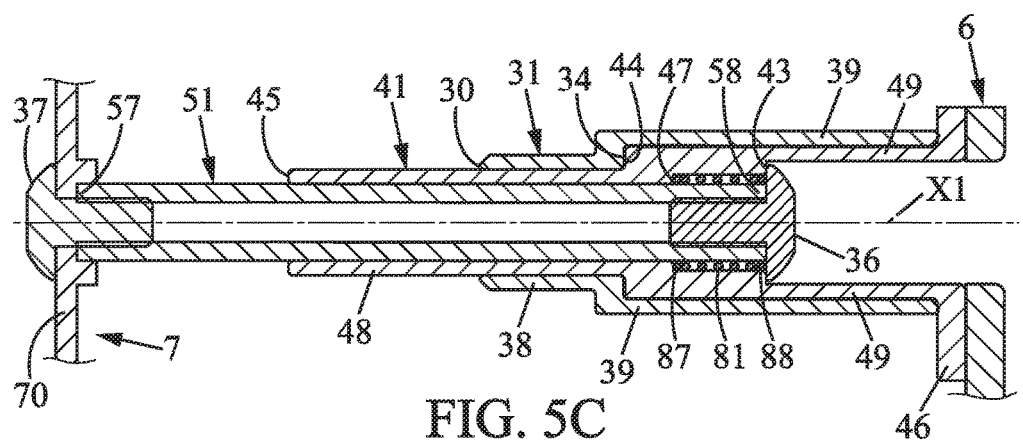
Figure 6:
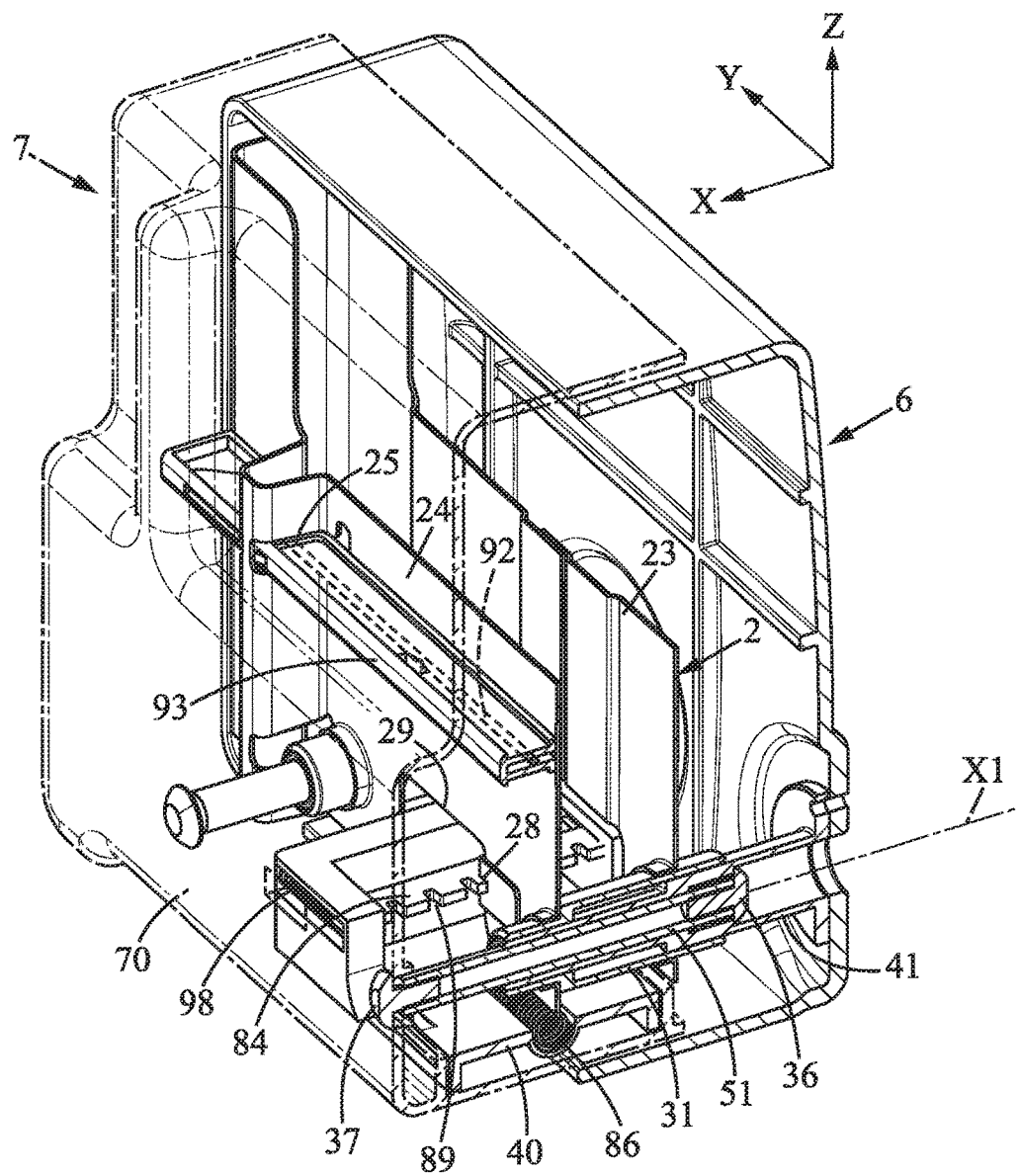
FIG. 6 is a more detailed partial perspective view showing the locking system.

Each of the rods 51, 52 (also called small struts) is formed by a hollow cylindrical tube in the example illustrated, made of metal or plastic. Each of the rods 51, 52 each comprises a front cap screw 37 at its front end 57 and a rear cap screw 36 at its back end 58; these cap screws are screwed into an internal thread of the tube (FIGS. 5A, 5B, 5C).

Each of the second sleeves 41, 42 forms a right circular cylinder with a rear base 46 connected to the rear shell, a rear tubular portion 49, and, as an extension, a front tubular portion 48 which terminates in a front end 45. The front tubular portion 48 has an inside diameter which is very slightly greater than the outside diameter of the rod 51 so as to provide the linear guiding function for at least 30 mm of length, preferably at least 40 mm of length.

Each of the first sleeves 31, 32 forms a right circular cylinder with a rear tubular portion 39 and, as an extension, a front tubular portion 38 which terminates in a front end 30. Front tubular portion 38 has an inside diameter which is very slightly greater than the outside diameter of front tubular portion 48 so as to provide a linear guiding function. Rear tubular portion 39 has an inside diameter which is very slightly greater than the outside diameter of the aforementioned rear tubular portion 49, which completes the linear guiding function.

Between the first and second sleeves, guidance is provided for at least 30 mm in length, preferably at least 40 mm in length.

With such an assembly, the slidable mounting of the rear shell on the guide plate provides a first adjustment travel portion denoted C1 (see FIG. 5A); and the slidable mounting of the front shell 7 on the rear shell 6 provides a second adjustment travel portion denoted C2 (see FIG. 5B).

The sum of the two travel portions C1, C2 forms a total travel distance denoted CT which is available for adjusting the front face along X, the length of this total travel distance CT being at least equal to 50 mm, preferably about 60 mm. Each of the two travel portions C1, C2 is preferably at least 25 mm each.

When the user actuates the control device 9 to unlock the current position starting from the rearmost position, it is the first travel portion C1 that is first available and biased, namely the simultaneous movement of the front and rear shell ensemble relative to the guide plate. This first translational movement reaches a stop when the external shoulder 44 of the second sleeve 41 abuts against the internal shoulder 34 of the first 31. If the forward traction of the front shell 7 is continued, then the second travel portion C2 is engaged, where the rear shell remains stationary and the front shell moves away from the rear shell. The second travel portion ends when the rear cap screw 36 abuts against the inner shoulder 43 of the second sleeve 41.

To contribute to this kinematic arrangement, at least one return spring 81 is provided to bias the front shell 7 rearward in the absence of external forces and when not locked. This return spring will be compressed in the second travel portion C2 (FIG. 4C, 5C) but is not subjected to stresses in the first travel portion C1 (FIG. 4A, 5A, 5A, 5B). In the example shown, there is a spring 8 on the left arranged around rod 51 and another spring 82 on the left arranged around rod 52.

Each spring comprises a front end 87 bearing on a shoulder 47 of the second sleeve and a back end 88 bearing on a shoulder of the rear cap screw 36.

The return springs 81, 82 are typically of the very common metal spiral compression type. The stiffness is chosen to allow displacement (compression) under moderate effort by the user, along the second travel portion C2.

The guide plate 2 comprises two uprights 21, 22 each having a U-shaped profile with the opening facing one another, the two uprights being connected to one another by a rear face 23 and a front face 24. On the front face 24, there is a rib-shaped projection extending vertically and forwardly with a notch 25 used for preventing movement along direction Z. There is also a central recess 29 on the front face 24, intended for preventing movement along direction X.

In the absence of any action requested by the control device 9, the current position is locked, more particularly the front shell 7 is made rigid with a toothed piece 84 which engages with one or more notches 28 available in the guide plate, more precisely on the edge of the abovementioned central recess 29.

Such locking makes it possible to avoid rearward movement of the front face 70 in the event of an impact, providing good protection for the neck of the occupant 101.

The control device 9 comprises an easily actuated button 91 and a guide 90, and comprises a return element 99 and a control carriage 40 which releases the locking elements, in the current case the locking elements for direction Z (wire 92) and the locking elements for direction X (toothed piece 84).

The control carriage 40 is mounted so as to be slidable along Y (transverse direction) relative to the front shell and thus selectively moveable when the button is pressed against the action of the spring 86.

A notched bar 84 comprises a plurality of successive notches 89 along X, into which a tooth (more generally a projection) 28 integral with the plate 2 is inserted. The notched bar is returned to the locking position by two springs 98, independently of the return of the control carriage.

Adjustment of the position of the front face 70 of the front shell 7 will typically be done by pressing the actuation button 91 and pulling the front shell forward, typically with one or both hands of the user 101 seated on the seat.

Sliding of the support plate 2 along the first direction Z may be prevented by first catching means 14, which in the illustrated example are notches on the uprights. A wire 92 inserted into a guide casing 93 engages with the notches 14, preventing any sliding along Z.

When the user presses the button 91, this moves the control carriage inwardly, forcing the wire 92 away from the notches 14, which unlocks the sliding along Z.

It will be noted that in the first travel portion C1, the thickness of the headrest body denoted EX in FIG. 4A is advantageously less than 100 mm and in the illustrated example less than 95 mm.

As for the guidance, it is possible in an alternative solution to have the front shell slidably mounted on the guide plate, similarly to the rear shell, with a return of one toward the other. The travel of the rear shell is shorter than that of the front shell, which makes it possible to have first C1 and second C2 travel portions as described above.

The locking elements could be arranged differently.

Although the example illustrated shows travel portions C1 and C2 of substantially the same length, it is possible to envisage C1 and C2 being different travel distances, by changing the abutment of the rear shell for example.

The invention claimed is:

1. An adjustable headrest for a motor vehicle seat, comprising:
   a support structure intended to be fixed to a backrest of said seat,
   a body connected to the support structure, comprising at least:
      a front shell having a front face intended for contact with the head of a user of the seat,
      a rear shell which forms, in complementarity with the front shell, a casing of the headrest body,
   the front face being movable relative to the support structure in a front-rear direction, over a total travel distance, this total travel distance being formed by at least:

a first travel portion provided by a translational movement of the body relative to the support structure, the position of the front shell relative to the rear shell remaining substantially constant, and a second travel portion provided by a translational movement of the front shell alone relative to the rear shell.

2. The headrest according to claim 1, wherein the total travel distance is at least equal to 50 mm.

3. The headrest according to claim 1, wherein the first and second travel portions each have a length that is close to half that of the total travel distance.

4. The headrest according to claim 1, wherein the headrest comprises a guide plate mounted on the support structure.

5. The headrest according to claim 4, wherein the rear shell is slidably mounted on the guide plate, forming the first travel portion, and the front shell is slidably mounted on the rear shell, forming the second travel portion.

6. The headrest according to claim 5, wherein the following guide elements are provided:

two first guide sleeves, securely fixed to the guide plate, two second sleeves, securely fixed to the rear shell and slidably mounted in the first sleeves, two rods rigidly fixed to the front shell and slidably mounted in the second sleeves.

7. The headrest according to claim 1, further comprising elements for locking the position of the headrest, and a control device for unlocking the locking elements to enable changing the adjustment position.

8. The headrest according to claim 1, wherein at least one return spring is provided for biasing the front shell rearward in the absence of external forces and when not locked.

9. The headrest according to claim 1, wherein the support structure comprises two headrest uprights, extending in a direction substantially corresponding to the vertical when the seat is in the normal position of use, and a cross-member on which the guide plate is mounted, possibly slidably.

10. The headrest according to claim 1, wherein the longitudinal thickness of the body remains less than 95 mm along the first travel portion.

11. A seat comprising a headrest according to claim 1.

* * * * *